United States Patent
Hutter

(10) Patent No.: US 6,437,037 B1
(45) Date of Patent: Aug. 20, 2002

(54) ROSIN-FATTY ACID VINYLIC POLYAMIDE POLYMER SUPPORTED LATICES

(75) Inventor: G. Frederick Hutter, Charleston, SC (US)

(73) Assignee: Westvaco Corporation, New York, NY (US)

(*) Notice: Subject to any disclaimer, the term of this patent is extended or adjusted under 35 U.S.C. 154(b) by 132 days.

(21) Appl. No.: 09/661,278

(22) Filed: Sep. 14, 2000

(51) Int. Cl.$^7$ ................... C08G 69/34; C08G 69/04; C08G 69/28; C08G 61/12; C08G 69/46
(52) U.S. Cl. ................ 524/460; 524/457; 524/458; 524/270; 524/272; 106/31.73
(58) Field of Search ................ 524/458, 457, 524/460, 270, 272; 106/31.73

(56) References Cited

U.S. PATENT DOCUMENTS

| | | |
|---|---|---|
| 3,412,115 A | 11/1968 | Floyd et al. |
| 3,480,578 A * | 11/1969 | Witt ................ 260/23.7 |
| 3,778,394 A | 12/1973 | Lovald et al. |
| RE28,533 E | 8/1975 | Drawert et al. |
| 4,111,877 A | 9/1978 | Dixon et al. |
| 4,487,940 A | 12/1984 | Sekmakas et al. |
| 4,526,915 A | 7/1985 | Sekmakas et al. |
| 4,870,139 A | 9/1989 | Kveglis et al. |
| 5,026,755 A | 6/1991 | Kveglis et al. |
| 5,180,782 A | 1/1993 | Stone et al. |
| 5,182,326 A * | 1/1993 | LeBlanc et al. ............ 524/514 |
| 5,183,847 A * | 2/1993 | El-Hefnawi et al. ..... 525/54.44 |
| 5,420,229 A | 5/1995 | Burke et al. |
| 5,656,679 A | 8/1997 | Hutter |
| 5,693,702 A | 12/1997 | Hutter |
| 6,069,275 A | 5/2000 | Schachat et al. |

FOREIGN PATENT DOCUMENTS

| | | |
|---|---|---|
| GB | 1236088 | 2/1972 |

OTHER PUBLICATIONS

Halbrook, N. J., R. V. Lawrence, R. L. Dressler, R. C. Blackstone, and W. Herz. Structure and Stereochemistry of Diels–Alder Adducts of Levopimaric Acid. *Journal of Organic Chemistry* vol. 29:1017–1021. 1964.

* cited by examiner

*Primary Examiner*—David W. Wu
*Assistant Examiner*—K C Egwim
(74) *Attorney, Agent, or Firm*—Daniel B. Reece IV; Terry B. McDaniel; Richard L. Schmalz

(57) ABSTRACT

This invention relates to novel rosin-fatty acid vinylic polyamide polymer supported latex compositions and the process for preparing them. More particularly, the invention concerns novel rosin-fatty acid vinylic polyamide graft polymer supported latex compositions which exhibit properties that make them useful as components of inks for printing on plastic films.

18 Claims, No Drawings

ROSIN-FATTY ACID VINYLIC POLYAMIDE POLYMER SUPPORTED LATICES

FIELD OF INVENTION

This invention relates to novel rosin-fatty acid vinylic polyamide polymer supported latex compositions and the process for preparing them. More particularly, the invention concerns novel rosin-fatty acid vinylic polyamide graft polymer supported latex compositions which exhibit properties that make them useful as components of inks for printing on plastic films.

BACKGROUND OF THE INVENTION

Acrylic and styrenic latices are widely used to formulate water-based printing inks, particularly for porous substrates such as paper or board. They are less widely used, however, for printing on non-porous substrates such as metal foils and plastic films. This is due primarily to their poor adhesion to these substrates relative to solvent-based inks or to aqueous inks based on more expensive resins such as polyurethanes.

The overwhelming majority of acrylic latices used in water-based printing inks are of a class called "supported" or "fortified" latices. These terms refer to the presence of a water-soluble polymer in the external (i.e. aqueous) phase of the latex. This soluble resin modifies the surface tension and rheology of the latex and the ink made from it in such a way as to improve its printing performance by facilitating flow in and out of the cells in printing press cylinders or plates. In addition, the soluble support resin increases the mechanical stability of the latex with respect to the shearing forces that an ink undergoes during printing.

Numerous attempts have been made to improve the adhesion of aqueous inks or coatings based on acrylic latices to various substrates, particularly by incorporating nitrogen-based functionality (such as amide, urea, or urethane groups) into either the internal phase or the support resin. Examples of incorporating nitrogen functionality into the internal polymer phase can be found in U.S. Pat. No. 4,111,877 (which teaches the use of urea-functional allylic monomers), U.S. Pat. Nos. 4,487,940, 4,526,915, and 6,069,275 (which teach the use of acrylic monomers containing urea and urethane groups), and U.S. Pat. No. 5,693,702 (which teaches the use of monomers containing urethane groups). An example of incorporating nitrogen functionality into the support resin is found in U.S. Pat. No. 5,656,679, which teaches the use of amide-containing rosin resins as support resins for acrylic emulsions. While the latices disclosed in this patent provide inks that have good peel strength in lamination applications, a problem exists in that these latices are generally deficient in adhesion as measured by the standard scotch tape pull test when employed in surface printing applications.

Therefore, an object of this invention is to solve this major problem by disclosing a method of producing rosin-fatty acid vinylic polyamide graft polymer latex compositions which exhibit properties that make them useful as components for formulating inks for printing on plastic films.

Another object of this invention is to disclose rosin-fatty acid vinylic polyamide polymer latex compositions.

SUMMARY OF THE INVENTION

The objects of this invention are met via the process of:
(a) forming an vinylic resin in the presence of a mixture of unsaturated fatty acid and rosin, (b) maleating the rosin fatty acid vinylic mixture in the same reactor, (c) adding a pre-formed polyamide resin and fusing it with the maleated rosin-fatty acid vinylic resin mixture to produce a rosin-fatty acid vinylic polyamide graft polymer, and (d) reacting the polymer in an emulsion polymerization reaction with (meth) acrylic and/or styrenic monomers to produce a rosin-fatty acid vinylic polyamide graft polymer latex composition which exhibit improved adhesion to plastic films. Such latex compositions are useful as components for printing inks and other coating applications.

DESCRIPTION OF THE PREFERRED EMBODIMENT

The rosin-fatty acid vinylic polyamide polymer supported latex compositions are the products of the process of:
(A) reacting in an addition polymerization reaction:
  (1) about 20.0% to about 60.0% by total weight of the reactants of a fatty acid rosin mixture comprising:
    (a) about 10.0% to about 90.0% by total weight of the fatty acid rosin mixture of fatty acid, and
    (b) about 10.0% to about 90.0% by total weight of the fatty acid rosin mixture of rosin; and
  (2) about 40.0% to about 80.0% by total weight of the reactants of a monomer mixture comprising:
    (a) about 15.0% to about 45.0% by total weight of the monomer mixture of a member selected from the group consisting of acrylic acid, methacrylic acid, fumaric acid, maleic anhydride, and combinations thereof,
    (b) about 55.0% to about 85.0% by total weight of a vinylic monomer,
    (c) about 0.5% to about 5.0% by total weight of the monomer mixture of a polymerization initiator,
    (d) up to about 4.0% by total weight of the monomer mixture of a chain transfer agent, and
    (e) up to about 30% by total weight of the monomer mixture of a hydrocarbon solvent, at a temperature in the range of about 135° C. to about 175° C. to produce a rosin-fatty acid vinylic polymer having a weight average molecular weight in the range of about 4,000 to about 12,000;
(B) reacting in an adduction polymerization reaction:
  (1) about 88.0% to about 99.5% by total weight of the reactants of the rosin-fatty acid vinylic polymer, and
  (2) about 0.5% to about 12.0% by total weight of the reactants of a member selected from the group consisting of α,β-unsaturated carboxylic acids, α,β-unsaturated carboxylic anhydrides, and combinations thereof at a temperature in the range of about 170° C. to about 240° C. to produce a maleated rosin fatty acid vinylic polymer;
(C) reacting in a condensation polymerization reaction:
  (1) about 65.0% to about 95.0% by total weight of the reactants of the maleated rosin fatty acid vinylic polymer, and
  (2) about 5.0% to about 35.0% by total weight of the reactants of a dimer acid-based polyamide resin at a temperature in the range of about 200° C. to about 280° C.; to produce a rosin-fatty acid vinylic polyamide polymer; and
(D) reacting in an emulsion polymerization reaction:
  (1) about 4.0% to about 3 5.0% by total weight of the reactants of the rosin-fatty acid vinylic polyamide polymer,
  (2) about 65.0% to about 96.0% by total weight of the reactants of a monomer selected from the group consisting of acrylic monomers, methacrylic monomers, styrenic monomers, and combinations thereof, (3) from about 0.1% to about 3.0% by total weight of the reactants of a polymerization initiator, and (4) up to about 12.0% by total weight of the reactants of a of a member selected from anionic surfactants, nonionic surfactants, and combinations thereof at a temperature in the range of about 40° C. to about 95° C. to produce the rosin-fatty acid vinylic polyamide polymer latex composition.

Preferred rosin-fatty acid vinylic polyamide polymer supported latex compositions are the products of the process of:

(A) reacting in an addition polymerization reaction:
(1) about 20.0% to about 60.0% by total weight of the reactants of a fatty acid rosin mixture comprising:
   (a) about 20.0% to about 50.0% by total weight of the fatty acid mixture of fatty acid, and
   (b) about 50.0% to about 80.0% by total weight of the fatty acid mixture of rosin; and
(2) about 40.0% to about 80.0% by total weight of the reactants of a monomer mixture comprising:
   (a) about 20.0% to about 25.0% by total weight of the monomer mixture of a member selected from the group consisting of acrylic acid, methacrylic acid, fumaric acid, maleic anhydride, and combinations thereof,
   (b) about 60.0% to about 70.0% by total weight of the monomer mixture of a vinylic monomer,
   (c) about 1.0% to about 3.0% by total weight of the monomer mixture of a polymerization initiator,
   (d) about 0.5% to about 2.0% by total weight of the monomer mixture of a chain transfer agent, and
   (e) up to about 4.0% by total weight of the monomer mixture of a hydrocarbon solvent, at a temperature in the range of about 140° C. to about 170° C. to produce a rosin-fatty acid vinylic polymer having a weight average molecular weight in the range of about 4,000 to about 12,000; and (B) reacting in an adduction polymerization reaction:
(1) about 92.0% to about 98.0% by total weight of the reactants of rosin-fatty acid vinylic polymer, and
(2) about 2.0% to about 8.0% by total weight of the reactants of a member selected from the group consisting of $\alpha,\beta$-unsaturated carboxylic acids, $\alpha,\beta$-unsaturated carboxylic anhydrides, and combinations thereof at a temperature in the range of about 180° C. to about 220° C. to produce a maleated rosin fatty acid vinylic polymer;

(C) reacting in a condensation polymerization reaction:
(1) about 75.0% to about 90.0% by total weight of the reactants of the maleated rosin fatty acid vinylic polymer; and
(2) about 10.0% to about 25.0% by total weight of the reactants of a dimer acid-based polyamide resin at a temperature in the range of about 220° C. to about 260° C. to produce a rosin-fatty acid vinylic polyamide polymer; and (D) reacting in an emulsion polymerization reaction:
(1) about 10.0% to about 30.0% by total weight of the reactants of the rosin-fatty acid vinylic polyamide polymer,
(2) about 70.0% to about 90.0% by total weight of the reactants of a monomer selected from the group consisting of acrylic monomers, methacrylic monomers, styrenic monomers, and combinations thereof,
(3) from about 0.1% to about 2.0% by total weight of the reactants of a polymerization initiator, and
(4) up to about 10.0% by total weight of the reactants of a of a member selected from anionic surfactants, nonionic surfactants, and combinations thereof at a temperature in the range of about 40° C. to about 95° C. to produce the rosin-fatty acid vinylic polyamide polymer latex composition.

The addition polymerization reaction used to produce the rosin-fatty acid vinylic polymer is a melt polymerization reaction in which no water is employed. Reaction temperatures suitable for use in the present method are within the range of about 135° C. to about 175° C.; with the preferred temperatures being in the range of about 140° C. to about 170° C.

The rosin and fatty acid function as solvents in the polymerization reaction of the acrylic monomers. Additionally, while a portion of the fatty acid and the rosin component remains unreacted, some of the fatty acid and rosin becomes graft polymerized onto the acrylic. The resulting rosin-fatty acid vinylic polymers have a weight average molecular weight in the range of about 4,000 to about 12,000; with the preferred molecular weights being in the range of about 5,000 to about 11,000.

Fatty acids which are suitable for use in the present method include those fatty acids which contain a range of carbon atoms from about $C_{12}$ to about $C_{24}$, with the preferred range being from about $C_{16}$ to $C_{20}$. It is further preferred that the fatty acid be vegetable or tall oil based. It is most preferred that the fatty acid be tall oil based and contain from about 15% to about 18% conjugated double bonds.

The fatty acid component comprises from about 10% to about 90% of the total weight of the fatty acid rosin mixture, with the preferred amount being from about 20% to about 50%.

The rosin component comprises from about 10% to about 90% of the total weight of the fatty acid rosin mixture, with the preferred amount being from about 50% to about 80%. Rosins which are preferred for use in the present method include wood rosin, tall oil rosin, gum rosin, and the like. It is further preferred to use tall oil rosin.

From about 15% to about 45% by total weight of the monomer mixture is a member selected from the group consisting of acrylic acid, methacrylic acid, fumaric acid, maleic anhydride, and combinations thereof. The preferred range of this component is from about 20% to about 25%.

From about 55% to about 85% by total weight of the monomer mixture is a vinylic monomer or combination of vinylic monomers. The preferred range of this component is from about 60% to about 70%. Preferred vinylic monomers include styrenic monomers, acrylic monomers, methacrylic monomers, and the like. It is further preferred that the vinylic monomer component be a mixture, preferably including at least one monoalkenyl aromatic monomer and at least one acrylic monomer. Suitable monoalkenyl aromatic monomers include, but are not limited to, the following: alpha-methyl styrene, styrene, vinyl toluene, tertiary butyl styrene, ortho-chlorostyrene, and mixtures thereof.

The term "acrylic monomer" as employed herein includes acrylic or methacrylic acid, esters of acrylic or methacrylic acid and derivatives and mixtures thereof. Examples of suitable acrylic monomers include the following methacrylate esters: methyl methacrylate, ethyl methacrylate, n-propyl methacrylate, n-butyl methacrylate, isopropyl methacrylate, isobutyl methacrylate, n-amyl methacrylate, n-hexyl methacrylate, isoamyl methacrylate, 2-hydroxyethyl methacrylate, 2-hydroxypropyl methacrylate, N,N-dimethylaminoethyl methacrylate, N,N-diethylaminoethyl methacrylate, t-butylaminoethyl methacrylate, 2-sulfoethyl methacrylate, trifluoroethyl methacrylate, glycidyl methacrylate, benzyl methacrylate, allyl methacrylate, 2-n-butoxyethyl methacrylate, 2-chloroethyl methacrylate, sec-butyl-methacrylate, tert-butyl methacrylate, 2-ethybutyl methacrylate, cinnamyl methacrylate, crotyl methacrylate, cyclohexyl methacrylate, cyclopentyl methacrylate, 2-ethoxyethyl methacrylate, furfuryl methacrylate, hexafluoroisopropyl methacrylate, methallyl methacrylate, 3-methoxybutyl methacrylate, 2-methoxybutyl methacrylate, 2-nitro-2-methylpropyl methacrylate, n-octylmethacrylate, 2-ethylhexyl methacrylate, 2-phenoxyethyl methacrylate, 2-phenylethyl methacrylate, phenyl methacrylate, propargyl methacrylate, tetrahydrofurfuryl methacrylate and tetrahydropyranyl methacrylate.

Other suitable acrylic monomers include methacrylic acid derivatives such as methacrylic acid and its salts, methacrylonitrile, methacrylamide, N-methylmethacrylamide, N-ethylmethacrylamide, N,N-diethymethacrylamide, N,N-dimethylmethacrylamide, N-phenyl-methacrylamide, methacrolein, and the like.

Acrylate esters suitable for use in the present method include methyl acrylate, ethyl acrylate, n-propyl acrylate, isopropyl acrylate, n-butyl acrylate, n-decyl acrylate, 2-ethylhexal acrylate, and the like.

Acrylic acid derivatives suitable for employment as the acrylic monomer include acrylic acid and its salts, acrylonitrile, acrylamide, methyl alpha-chloroacrylate, methyl 2-cyanoacrylate, N-ethylacrylamide, N,N-diethylacrylamide, acrolein, and the like.

The present invention method is also applied to the preparation of copolymers from mixtures of two or more acrylic monomers such as termonomers and tetramonomers. It is also contemplated that mixtures of at least one acrylic monomer and at least one non-acrylic ethylenic monomer may be polymerized with monoalkenyl aromatic monomers in accordance with the present method.

Ethylenic monomers suitable for use in the present method include vinylpyridine, vinylpyrollidone, sodium crotonate, methyl crotonate, crotonic acid, maleic anhydride, and the like.

The type of polymerization initiator suitable for use in the addition polymerization reaction is known in the art to depend upon the desired temperature for the reaction. Suitable initiators include, but are not limited to, the following: t-butyl peroxide, t-butyl peroxybenzoate, t-butyl peroctoate, cumene hydroperoxide, azobisisobutyronitrile, benzoyl peroxide, and combinations thereof. The polymerization initiator comprises from about 0.5% to about 5.0% by total weight of the monomer mixture, with the preferred amount being in the range of about 1.0% to about 3.0%.

Where desired, a chain transfer agent may be employed in the present method. Chain transfer agents which are suitable for use in the above reaction include, but are not limited to, the following: dodecyl mercaptan, mercaptoacetic acid, mercaptopropionic acid, octyl mercaptan, 2-mercaptoethanol, and combinations thereof. When employed, it is preferred to use an amount of chain transfer agent in the range of from about 0.5% to about 2.0% by total weight of the monomer mixture of chain transfer agent, but up to about 4.0% may be utilized.

Where desired, hydrocarbon solvents may be employed in the present method. Suitable hydrocarbon solvents include aromatic solvents, aliphatic solvents, and combinations thereof. It is preferred to use an amount of hydrocarbon solvent in the range of up to about 4.0% by total weight of the monomer mixture, but up to about 30% may be utilized.

It is preferred to employ a bulk polymerization process for the addition polymerization reaction. The residence time for such bulk processes is commonly in the range of about 3 hours to about 10 hours.

From about 0.50% to about 12.0% by total weight of the reactants in the adduction polymerization reaction are members selected from the group consisting of $\alpha,\beta$-unsaturated carboxylic acids, $\alpha,\beta$-unsaturated carboxylic anhydrides, and combinations thereof. The preferred amount of these reactants is from about 2% to about 8%. Examples of $\alpha,\beta$-unsaturated carboxylic acids and anhydrides which are preferred for use in the present method include maleic acid, maleic anhydride, fumaric acid, acrylic acid, methacrylic acid, itaconic acid, itaconic anhydride, and the like. It is further preferred to utilize maleic anhydride and/or fumaric acid. The adduction polymerization reaction is carried out at a temperature in the range of from about 170° to about 240°, preferably from about 180° to about 220° C., for a period of time sufficient of the reaction to occur (normally from about one to five hours).

The dimer acid-based polyamide resin component comprises from about 5% to about 35% of the reactants in the condensation polymerization reaction, with the preferred amount being from about 10% to about 25%. Examples of polyamides which are suitable for use in the present method include those which are made by the well-known condensation polymerization of dimerized fatty acids with diamines, such as the polyamides disclosed in British Patent No. 1,236,088 and U.S. Pat. Nos. 3,412,115; 3,778,394, and Re. 28,533 (which are hereby incorporated by reference) and the like. Suitable commercially available polyamides include VERSAMID and MACROMELT (dimer-acid based polyamides manufactured by the Henkel Corporation).

From about 65% to about 96% by total weight of the reactants in the emulsion polymerization reaction are monomers selected from the group consisting of acrylic monomers, methacrylic monomers, styrenic monomers, and combinations thereof. It is preferred to employ monomers in the range of from about 70% to about 90%. Preferred monomers include styrene, substituted styrenes, acrylic acid, alkyl and cycloalkyl acrylates containing from one to 18 carbon atoms in the alkyl or cycloalkyl group, methacrylic acid, alkyl and cycloalkyl methacrylates containing from one to 18 carbon atoms in the alkyl or cycloalkyl group, hydroxyalkyl acrylates, hydroxyalkyl methacrylates, acrylonitrile, and combinations thereof.

The type of polymerization initiator suitable for use in the emulsion polymerization reaction is known in the art to depend upon the desired temperature for the reaction. Suitable initiators include any of the free radical initiators or redox initiators that are commonly employed in emulsion polymerization reactions, and combinations thereof. Preferred initiators include t-butyl peroxide, t-butyl peroxybenzoate, t-butyl peroctoate, cumene hydroperoxide, azobisisobutyronitrile, benzoyl peroxide, and the like. The polymerization initiator can comprise from about 0.1% to about 3.0% by total weight of the emulsion polymerization reactants, with the preferred amount being from about 0.1% to about 2.0%.

Any of the nonionic and anionic surfactants commonly employed in emulsion polymerization reactions can be utilized in the present method. Suitable nonionic surfactants include ethoxylated alcohols, ethoxyated alkylphenols, ethylene oxide/propylene oxide block copolymers, and the like. Suitable anionic surfactants include alkyl sulfosuccinates, sodium alkylsulfonates, and the like. Where desired, a combination of nonionic and anionic surfactants may be utilized in the reaction. The surfactant component can comprise up to about 12.0% by total weight of the emulsion polymerization reactants, with the preferred amount being up to about 10.0%.

The emulsion polymers of the invention can be formulated into printing inks by mixing them with aqueous pigment dispersions. Commercially available dispersions, such as those marketed by Sun Chemical under the trade name FLEXIVERSE, may be used, or the dispersions may be made by dispersing pigments in water by methods that are well known in the art. In addition to the emulsion polymer of the invention and the pigment dispersion, other aqueous polymer emulsions or solutions can be incorporated into the ink to achieve desirable properties such as flow and block resistance. Waxes, slip additives, transfer aids, and other ink additives that are commonly used in the art may also be added to the ink.

Rosin-fatty acid vinylic polyamide polymer latices which are supported by the rosin-fatty acid vinylic polyamide polymer resins may be prepared by known polymerization techniques for making supported emulsion polymers. For example, a latex of the present invention may be produced by the steps of first dissolving from 5 to 50 parts by weight (based on 100 parts of monomer), preferably from 10 to 40 parts by weight, of the rosin-fatty acid vinylic polyamide support resin in aqueous base. Suitable bases include ammonia, water-soluble amines, alkali metal hydroxides (e.g., sodium hydroxide or potassium hydroxide) and the like. The resulting solution should have a pH of from about 8 to about 10, preferably from about 8.5 to about 9.5. Subsequently, a surfactant and an initiator is added to the solution. The resulting solution is then heated to the desired reaction temperature, usually from 40 to 95° C., preferably from 60 to 85° C., depending on the initiator. The monomer is pumped into the reaction vessel, with stirring, over a period of from one to four hours. If needed, one may optionally add more initiator to scavenge any residual unreacted monomer, and continue stirring the mixture for an additional period of up to six hours to complete reaction of the monomer.

The procedure described above is a preferred method of utilizing the amide-functional support resin to make an emulsion polymer, but other techniques that are well known in the art may also be used. These include adding the initiator after reaction temperature has been reached, pre-emulsifying the monomer with water and surfactant before pumping it into the reactor, or precharging all of the monomer before the initiator is charged.

The following examples are provided to further illustrate the present invention and are not to be construed as limiting the invention in any manner. In the examples all parts are given by weight.

EXAMPLE 1

A rosin-fatty acid vinylic polyamide polymer supported latex composition was prepared via the following method. A reactor vessel equipped with a thermometer, stirrer, monomer feed pump, and a blanket nitrogen intake line was charged at room temperature with a mixture of 20 parts of L-5 Fatty Acid (a tall oil fatty acid composition commercially available from Westvaco Corporation) and 20 parts of Rosin SS (a tall oil rosin composition commercially available from Westvaco Corporation). The mixture was heated under a nitrogen blanket to 145° C. and held at that temperature, whereupon Charge A was added, with stirring, over a three hour period. Charge A consisted of a mixture of 18.3 parts of styrene, 18.3 parts of a-methylstyrene, 21.2 parts of acrylic acid, and 2.23 parts of di-tert-butyl peroxide. After the addition of Charge A was completed, the reaction mixture was heated to 180° C. and held for one hour. At that time 3.9 parts of maleic anhydride was added and the reaction temperature was increased to 200° C. After one hour, 17.1 parts of VERSAMID 754 (a dimer acid-based polyamide commercially available from the Henkel Corporation) was added, the reaction temperature was increased to 230° C. and held for two hours. The resulting rosin-fatty acid vinylic polyamide polymer was a solid resin having an acid number of 198, a ring and ball softening point of 121° C., and was readily soluble in aqueous ammonia.

To a reaction flask fitted with a mechanical stirrer and a reflux condenser was charged 177 parts of deionized water and 8.5 parts of 28% aqueous ammonia. To this was added 36.9 parts of the rosin-fatty acid vinylic polyamide polymer resin, and the mixture was stirred until the resin dissolved. The solution was heated to 83° C., and 1.14 parts of diethylene glycol monobutyl ether, a solution of 0.76 part ammonium persulfate in 15 parts of water, and a solution of 0.142 part of cumene hydroperoxide in 1.14 parts of deionized water were added. Then a monomer solution consisting of 26.0 parts of methyl methacrylate, 39.8 parts of butyl acrylate, and 34.2 parts of 2-ethylhexyl acrylate was pumped into the reaction mixture over a period of two hours. Halfway through the monomer addition, 7 parts of water was added to counter the increasing viscosity of the mixture. After the monomer addition was complete, a solution of 0.06 part of sodium formaldehyde sulfoxylate in 5.68 parts of water and a solution of 0.06 part of ammonium persulfate in 5.68 parts of deionized water were added, and stirring was continue at 83° C. for three hour to complete reaction of the monomer. The resulting rosin-fatty acid vinylic polyamide polymer supported latex composition (hereinafter referred to as "Latex No. 1") had a solids content of 37.8%, a viscosity of 2600 cP, and a pH of 8.1.

EXAMPLE 2

A rosin-fatty acid vinylic polyamide polymer supported resin composition was prepared via the following method. A reactor vessel equipped with a thermometer, stirrer, monomer feed pump, and a blanket nitrogen intake line was charged at room temperature with a mixture of 20 parts of L-5 Fatty Acid (a tall oil fatty acid composition commercially available from Westvaco Corporation) and 20 parts of ww gum rosin. The mixture was heated under a nitrogen blanket to 145° C. and held at that temperature, whereupon Charge A was added, with stirring, over a three hour period. Charge A consisted of a mixture of 18.3 parts of styrene, 18.3 parts of α-methylstyrene, 21.2 parts of acrylic acid, and 2.23 parts of di-tert-butyl peroxide. After the addition of Charge A was completed, the reaction mixture was heated to 180° C. and held for one hour. At that time 3.93 parts of fumaric acid was added and the reaction temperature was increased to 200° C. After one hour, 17.1 parts of VERSAMID 754 (a dimer acid-based polyamide commercially available from the Henkel Corporation) was added, the reaction temperature was increased to 230° C. and held for two hours. The resulting rosin-fatty acid vinylic polyamide polymer was a solid resin having an acid number of 198, a ring and ball softening point of 135° C., and was readily soluble in aqueous ammonia.

To a reaction flask fitted with a mechanical stirrer and a reflux condenser was charged 177 parts of deionized water and 8.5 parts of 28% aqueous ammonia. To this was added 36.9 parts of the rosin-fatty acid vinylic polyamide polymer resin, and the mixture was stirred until the resin dissolved. The solution was heated to 83° C., and 1.14 parts of diethylene glycol monobutyl ether, a solution of 0.76 part ammonium persulfate in 15 parts of water, and a solution of 0.142 part of cumene hydroperoxide in 1.14 parts of deionized water were added. Then a monomer solution consisting of 26.0 parts of methyl methacrylate, 39.8 parts of butyl acrylate, and 32.2 parts of 2-ethylhexyl acrylate was pumped into the reaction mixture over two hours. Halfway through the monomer addition, 57 parts of water was added to counter the increasing viscosity of the mixture. After the monomer addition was complete, a solution of 0.06 part of sodium formaldehyde sulfoxylate in 5.68 parts of deionized water and a solution of 0.06 part of ammonium persulfate in 5.68 parts of deionized water were added, and stirring was continued at 83° C. for three hours to complete reaction of the monomer. The resulting rosin-fatty acid vinylic polyamide polymer supported latex composition (hereinafter referred to as "Latex No. 2") had a solids content of 29.6%, a viscosity of 4550 cP, and a pH of 8.9.

EXAMPLE 3

A rosin-fatty acid vinylic polyamide polymer supported latex composition was prepared via the following method. A reactor vessel equipped with a thermometer, stirrer, monomer feed pump, and a blanket nitrogen intake line was charged at room temperature with a mixture of 20 parts of L-5 Fatty Acid (a tall oil fatty acid composition commercially available from Westvaco Corporation) and 20 parts of Rosin SS (a tall oil rosin composition commercially available from Westvaco Corporation). The mixture was heated under a nitrogen blanket to 145° C. and held at that temperature, whereupon Charge A was added, with stirring, over a three hour period. Charge A consisted of a mixture of 18.3 parts of styrene, 18.3 parts of α-methylstyrene, 21.2 parts of acrylic acid, and 2.23 parts of di-tert-butyl peroxide. After the addition of Charge A was completed, the reaction mixture was heated to 180° C. and held for one hour. At that time 3.9 parts of maleic anhydride was added and the reaction temperature was increased to 200° C. After one hour, 17.1 parts of MACROMELT 6240 (a dimer acid-based polyamide commercially available from the Henkel Corporation) was added, the reaction temperature was increased to 230° C. and held for two hours. The resulting rosin-fatty acid vinylic polyamide polymer was a solid resin having an acid number of 210, a ring and ball softening point of 132° C., and was readily soluble in aqueous ammonia.

To a reaction flask fitted with a mechanical stirrer and a reflux condenser was charged 177 parts of deionized water and 8.5 parts of 28% aqueous ammonia. To this was added 36.9 parts of the rosin-fatty acid vinylic polyamide polymer resin, and the mixture was stirred until the resin dissolved. The solution was heated to 83° C., and 1.14 parts of diethylene glycol monobutyl ether, a solution of 0.76 part ammonium persulfate in 15 parts of deionized water, and a solution of 0.142 part of cumene hydroperoxide in 1.14 parts of deionized water were added. Then a monomer solution consisting of 26.0 parts of methyl methacrylate, 39.8 parts of butyl acrylate, and 32.2 parts of 2-ethylhexyl acrylate was pumped into the reaction mixture over two hours. Halfway through the monomer addition, 7 parts of deionized water was added to counter the increasing viscosity of the mixture. After the monomer addition was complete, a solution of 0.06 part of sodium formaldehyde sulfoxylate in 5.68 parts of deionized water and a solution of 0.06 part of ammonium persulfate in 5.68 parts of deionized water were added, and stirring was continued at 83° C. for three hours to complete reaction of the monomer. The resulting rosin-fatty acid vinylic polyamide polymer supported latex composition (hereinafter referred to as "Latex No. 3") had a solids content of 36.5%, a viscosity of 2600 cP, and a pH of 8.3.

EXAMPLE 4

Latex Nos. 1,2, and 3 were each employed to produce an aqueous ink by mixing 40 parts of latex with 5 parts isopropyl alcohol, 5 parts deionized water and 50 parts white pigment dispersion. (The white pigment dispersion was made from 65 parts titanium dioxide pigment, 3 parts 28% aqueous ammonia, 7 parts MOREZ 101 (an acrylic resin commercially available from Rohm and Haas Company), 19 parts deionized water, and 6 parts isopropanol.)

The resulting inks were reduced to a viscosity of 20±2 seconds as measured with a #2 Zahn cup and applied to corona-treated polyethylene film with a flexo hand proofer equipped with a 165-line quad cylinder. After drying for 5 minutes at room temperature, all of the inks showed good to excellent adhesion as measured by the commonly used Scotch tape pull test.

Many modifications and variations of the present invention will be apparent to one of ordinary skill in the art in light of the above teachings. It is therefore understood that the scope of the invention is not to be limited by the foregoing description, but rather is to be defined by the claims appended hereto.

What is claimed is:

1. A rosin-fatty acid vinylic polyamide polymer latex composition comprising the reaction product prepared by:

(A) reacting in an addition polymerization reaction:
  (1) about 20.0% to about 60.0% by total weight of the reactants of the addition polymerization reaction of a fatty acid rosin mixture comprising:
    (a) about 10.0% to about 90.0% by total weight of the fatty acid rosin mixture of fatty acid, and
    (b) about 10.0% to about 90.0% by total weight of the fatty acid rosin mixture of rosin; and
  (2) about 40.0% to about 80.0% by total weight of the reactants of the addition polymerization reaction of a monomer mixture comprising:
    (a) about 15.0% to about 45.0% by total weight of the monomer mixture of a member selected from the group consisting of acrylic acid, methacrylic acid, fumaric acid, maleic anhydride, and combinations thereof,
    (b) about 55.0% to about 85.0% by total weight of a non-carboxylic acid containing vinylic monomer,
    (c) about 0.5% to about 5.0% by total weight of the monomer mixture of a polymerization initiator,
    (d) up to about 4.0% by total weight of the monomer mixture of a chain transfer agent, and
    (e) up to about 30% by total weight of the monomer mixture of a hydrocarbon solvent, at a temperature in the range of about 135° C. to about 175° C. to produce a rosin-fatty acid vinylic polymer having a weight average molecular weight in the range of about 4,000 to about 12,000;

(B) reacting in an adduction polymerization reaction:
  (1) about 88.0% to about 99.5% by total weight of the reactants of the adduction polymerization reaction of the rosin-fatty acid vinylic polymer, and
  (2) about 0.5% to about 12.0% by total weight of the reactants of the adduction polymerization reaction of a member selected from the group consisting of α,β-unsaturated carboxylic acids, α,β-unsaturated carboxylic anhydrides, and combinations thereof at a temperature in the range of about 170° C. to about 240° C. to produce a maleated rosin fatty acid vinylic polymer;

(C) reacting in a condensation polymerization reaction:
  (1) about 65.0% to about 95.0% by total weight of the reactants of the condensation polymerization reaction of the maleated rosin fatty acid vinylic polymer, and
  (2) about 5.0% to about 35.0% by total weight of the reactants of the condensation polymerization reaction of a dimer acid-based polyamide resin at a temperature in the range of about 200° C. to about 280° C.; to produce a rosin-fatty acid vinylic polyamide polymer; and
(D) reacting in an emulsion polymerization reaction:
  (1) about 4.0% to about 35.0% by total weight of the reactants of the emulsion polymerization reaction of the rosin-fatty acid vinylic polyamide polymer,
  (2) about 65.0% to about 96.0% by total weight of the reactants of the emulsion polymerization reaction of a monomer selected from the group consisting of acrylic monomers, methacrylic monomers, styrenic monomers, and combinations thereof,
  (3) from about 0.1% to about 3.0% by total weight of the reactants of the emulsion polymerization reaction of a polymerization initiator, and
  (4) up to about 12.0% by total weight of the reactants of the emulsion polymerization reaction of a member selected from anionic surfactants, nonionic surfactants, and combinations thereof; at a temperature in the range of about 40° C. to about 95° C. to produce the rosin-fatty acid vinylic polyamide polymer latex composition.

2. The rosin-fatty acid vinylic polyamide polymer latex composition of claim 1 comprising the reaction product prepared by:
(A) reacting in an addition polymerization reaction:
  (1) about 20.0% to about 60.0% by total weight of the reactants of the addition polymerization reaction of a fatty acid rosin mixture comprising:
    (a) about 20.0% to about 50.0% by total weight of the fatty acid mixture of fatty acid, and
    (b) about 50.0% to about 80.0% by total weight of the fatty acid mixture of rosin; and
  (2) about 40.0% to about 80.0% by total weight of the reactants of the addition polymerization reaction of a monomer mixture comprising:
    (a) about 20.0% to about 25.0% by total weight of the monomer mixture of a member selected from the group consisting of acrylic acid, methacrylic acid, fumaric acid, maleic anhydride, and combinations thereof,
    (b) about 60.0% to about 70.0% by total weight of the monomer mixture of a non-carboxylic acid containing vinylic monomer,
    (c) about 1.0% to about 3.0% by total weight of the monomer mixture of a polymerization initiator,
    (d) about 0.5% to about 2.0% by total weight of the monomer mixture of a chain transfer agent, and
    (e) up to about 4.0% by total weight of the monomer mixture of a hydrocarbon solvent, at a temperature in the range of about 140° C. to about 170° C. to produce a rosin-fatty acid vinylic polymer having a weight average molecular weight in the range of about 5,000 to about 11,000; and
(B) reacting in an adduction polymerization reaction:
  (1) about 92.0% to about 98.0% by total weight of the reactants of the adduction polymerization reaction of rosin-fatty acid vinylic polymer, and
  (2) about 2.0% to about 8.0% by total weight of the reactants of the adduction polymerization reaction of a member selected from the group consisting of α,β-unsaturated carboxylic acids, α,β-unsaturated carboxylic anhydrides, and combinations thereof at a temperature in the range of about 180° C. to about 220° C. to produce a maleated rosin fatty acid vinylic polymer;
(C) reacting in a condensation polymerization reaction:
  (1) about 75.0% to about 90.0% by total weight of the reactants of the condensation polymerization reaction of the maleated rosin fatty acid vinylic polymer; and
  (2) about 10.0% to about 25.0% by total weight of the reactants of the condensation polymerization reaction of a dimer acid-based polyamide resin at a temperature in the range of about 220° C. to about 260° C. to produce a rosin-fatty acid vinylic polyamide polymer; and
(D) reacting in an emulsion polymerization reaction:
  (1) about 10.0% to about 30.0% by total weight of the reactants of the emulsion polymerization reaction of the rosin-fatty acid vinylic polyamide polymer,
  (2) about 70.0% to about 90.0% by total weight of the reactants of the emulsion polymerization reaction of a monomer selected from the group consisting of acrylic monomers, methacrylic monomers, styrenic monomers, and combinations thereof,
  (3) from about 0.1% to about 2.0% by total weight of the reactants of the emulsion polymerization reaction of a polymerization initiator, and
  (4) up to about 10.0% by total weight of the reactants of the emulsion polymerization reaction of a member selected from anionic surfactants, nonionic surfactants, and combinations thereof at a temperature in the range of about 40° C. to about 95° C. to produce the rosin-fatty acid vinylic polyamide polymer latex composition.

3. The latex composition of claim 1 wherein the fatty acid is a member selected from the group consisting of fatty acids containing from 12 to 24 carbon atoms and combinations thereof.

4. The latex composition of claim 1 wherein the rosin is a member selected from the group consisting of tall oil rosin, wood rosin, gum rosin, and combinations thereof.

5. The latex composition of claim 1 wherein the non-carboxylic acid containing vinylic monomer is a member selected from the group consisting of styrenic monomers, acrylic monomers, methacrylic monomers, and combinations thereof.

6. The latex composition of claim 5 wherein the non-carboxylic acid containing vinylic monomer is a mixture containing at least one monoalkenyl aromatic monomer and at least one acrylic monomer.

7. The latex composition of claim 6 wherein the monoalkenyl aromatic monomer is a member selected from the group consisting of alpha-methyl styrene, styrene, vinyl toluene, tertiary butyl styrene, ortho-chlorostyrene, and combinations thereof.

8. The latex composition of claim 5 wherein the acrylic monomer is a member selected from the group consisting of methyl methacrylate, ethyl methacrylate, n-propyl methacrylate, n-butyl methacrylate, isopropyl methacrylate, isobutyl methacrylate, n-amyl methacrylate, n-hexyl methacrylate, isoamyl methacrylate, 2-hydroxyethyl methacrylate, 2-hydroxypropyl methacrylate, N,N-dimethylaminoethyl methacrylate, N,N-diethylaminoethyl methacrylate, t-butylaminoethyl methacrylate, 2-sulfoethyl methacrylate, trifluoroethyl methacrylate, glycidyl methacrylate, benzyl methacrylate, allyl methacrylate, 2-n-butoxyethyl methacrylate, 2-chloroethyl methacrylate, sec-butyl-methacrylate, tert-butyl methacrylate, 2-ethybutyl methacrylate, cinnamyl methacrylate, crotyl methacrylate, cyclohexyl methacrylate, cyclopentyl methacrylate, 2-ethoxyethyl methacrylate, furfuryl methacrylate, hexafluoroisopropyl methacrylate, methallyl methacrylate, 3-methoxybutyl methacrylate, 2-methoxybutyl methacrylate, 2-nitro-2-methylpropyl methacrylate, n-octylmethacrylate, 2-ethylhexyl methacrylate, 2-phenoxyethyl methacrylate, 2-phenylethyl methacrylate, phenyl methacrylate, propargyl methacrylate, tetrahydrofurfuryl methacrylate, tetrahydropyranyl methacrylate, methacrylonitrile, methacrylamide, N-methylmethacrylamide, N-ethylmethacrylamide, N,N-diethymethacrylamide, N,N-dimethylmethacrylamide, N-phenyl-methacrylamide, methacrolein, methyl acrylate, ethyl acrylate, n-propyl acrylate, isopropyl acrylate, n-butyl acrylate, n-decyl acrylate acrylonitrile, acrylamide, methyl alpha-chloroacrylate, methyl 2-cyanoacrylate, N-ethylacrylamide, N,N-diethylacrylamide, acrolein, and combinations thereof.

9. The latex composition of claim 1 wherein the polymerization initiator in the addition polymerization reaction is a member selected from the group consisting of t-butyl peroxide, t-butyl peroxybenzoate, t-butyl peroctoate, cumene hydroperoxide, azobisisobutyronitrile, benzoyl peroxide, and combinations thereof.

10. The latex composition of claim 1 wherein the chain transfer agent is a member selected from the group consisting of dodecyl mercaptan, mercaptoacetic acid, mercaptopropionic acid, octyl mercaptan, 2-mercaptoethanol, and combinations thereof.

11. The latex composition of claim 1 wherein the hydrocarbon solvent is a member selected from the group consisting of aromatic solvents, aliphatic solvents, and combinations thereof.

12. The latex composition of claim 1 wherein the α,β-unsaturated carboxylic acid is a member selected from the group consisting of maleic acid, fumaric acid, acrylic acid, methacrylic acid, itaconic acid, and combinations thereof.

13. The latex composition of claim 1 wherein the α,β-unsaturated anhydride is a member selected from the group consisting of maleic anhydride, itaconic anhydride, and combinations thereof.

14. The latex composition of claim 1 wherein the monomer in the emulsion polymerization reaction is a member selected from the group consisting of styrene, substituted styrenes, acrylic acid, alkyl acrylates containing from one to 18 carbon atoms in the alkyl group, cycloalkyl acrylates containing from one to 18 carbon atoms in the cycloalkyl group, methacrylic acid, alkyl methacrylates containing from one to 18 carbon atoms in the alkyl group, cycloalkyl methacrylates containing from one to 18 carbon atoms in the cycloalkyl group, hydroxyalkyl acrylates, hydroxyalkyl methacrylates, acrylonitrile, and combinations thereof.

15. The latex composition of claim 1 wherein the polymerization initiator in the emulsion polymerization reaction is a member selected from the group free radical initiators, redox initiators, and combinations thereof.

16. The latex composition of claim 1 wherein the surfactant is a member selected from the group consisting of ethoxylated alcohols, ethoxyated alkylphenols, ethylene oxide/propylene oxide block copolymers, alkyl sulfosuccinates, sodium alkylsulfonates, and combinations thereof.

17. An ink comprising the latex composition of claim 1 and an aqueous pigment dispersion.

18. An ink comprising the latex composition of claim 2 and an aqueous pigment dispersion.

* * * * *

UNITED STATES PATENT AND TRADEMARK OFFICE
CERTIFICATE OF CORRECTION

PATENT NO.   : 6,437,037 B1
DATED        : August 20, 2002
INVENTOR(S)  : G. Frederick Hutter It is certified that error appears in the above-identified patent and that said Letters Patent is hereby corrected as shown below:

Column 7,
Line 65, delete "a-methylstyrene" and substitute therefor -- α-methylstyrene --.

Column 9,
Line 5, delete "32.2" and substitute therefor -- 34.2 --.
Line 55, delete "32.2" and substitute therefor -- 34.2 --.

Column 13,
Line 19, after "n-decyl acrylate" insert -- , --.

Signed and Sealed this

Twenty-ninth Day of October, 2002

*Attest:*

JAMES E. ROGAN
*Attesting Officer*    *Director of the United States Patent and Trademark Office*